July 3, 1962     J. HOCHBERG     3,042,574
METHOD OF MAKING LAMINATED STRUCTURES
Filed Aug. 29, 1958

INVENTOR
JEROME HOCHBERG
BY P. J. Poindexter
AGENT

United States Patent Office 3,042,574
Patented July 3, 1962

3,042,574
METHOD OF MAKING LAMINATED STRUCTURES
Jerome Hochberg, Newburgh, N.Y., assignor to E. I. du Pont de Nemours and Company, Wilmington, Del., a corporation of Delaware
Filed Aug. 29, 1958, Ser. No. 757,995
4 Claims. (Cl. 156—286)

This invention relates to methods of making laminated structures, and more particularly to a method of laminating plies of bondable sheet materials which may be laminated to one another by means of heat and pressure.

It is well known that useful laminated structures can be made by laminating plies of bondable sheet materials in a heated press. For example, when two or more plies of polytetrafluoroethylene coated glass fabric are placed in a hydraulic press with the plies in superposed relation and subjected to sufficient heat and pressure, a composite laminate is produced.

The hydraulic press method of lamination is, however, characterized by certain limitations which render it unsatisfactory or impossible to use in certain situations, such as, e.g.:

(a) When the width of the desired laminate is greater than that of the platens of the largest available press, (b) When market potential for the laminate is not great enough to justify the cost of a press, (c) When a shaped laminate is required for which it is uneconomical to build a suitable pressure mold, (d) When the size or shape of the laminate prevents elimination of air entrapped between the plies within reasonable limits of time and pressure, (e) When unusually high laminating temperature or exacting temperature control is required, and (f) When the laminating operation must be performed in a controlled atmosphere.

It is therefore the primary object of this invention to provide a new method of laminating polytetrafluoroethylene plies whereby unusually large and/or irregularly shaped laminates can be produced with relatively simple and inexpensive equipment. Another object is to provide a laminating method which is well adapted for use with high laminating temperatures and controlled atmospheres. Other objects will be apparent from the following description of the invention.

The foregoing objects are accomplished by enclosing a plurality of superposed plies of polytetrafluoroethylene sheet material within an air impermeable envelope, evacuating a substantial portion of air from within the envelope and, while maintaining reduced pressure within the envelope, subjecting it to a temperature which causes the plies to become bonded into an integral laminated structure, e.g., in the case of homopolymers of polytetrafluoroethylene at least about 621° F.

The method of this invention also includes the modification in which the outer plies forming the envelope are non-bondable heat-resistant plies, such as, e.g., sheets of aluminum, copper or tin foil, which may be removed from the product after laminating. The invention further includes the procedure of employing a rigid or semi-rigid non-bondable ply, e.g., metal sheet, as one of the outer plies for forming the air impermeable envelope, which may be either bonded into the product or removed after the laminating operation. The invention further contemplates the method in which a rigid non-thermoplastic mold forms one side of the air impermeable envelope to which the polytetrafluoroethylene plies do not adhere.

The term "polytetrafluoroethylene" refers to homopolymers of tetrafluoroethylene and to copolymers thereof containing, e.g., minor portions of vinylidene fluoride, vinyl fluoride or hexafluoropropene.

Throughout the specification and claims, the term "polytetrafluoroethylene sheet material or plies" refers to unsupported film of polytetrafluoroethylene or heat resistant substrates, such as, e.g., those of glass, asbestos and metal, either coated or impregnated, or impregnated and coated with polytetrafluoroethylene.

The following examples will serve to illustrate specific embodiments of the invention, reference being had to the accompanying drawing wherein like numerals identify like parts in the various views.

*Example I*

A quantity of polytetrafluoroethylene coated glass fabric is prepared in a known manner, such as described in U.S. Patent 2,539,329, by repeatedly dipping a woven glass fabric weighing 6 ounces per sq. yd. in an aqueous suspensoid of polytetrafluoroethylene, drying after each successive dip, calendering after the final dip to smooth and close any "mud-cracks" present in the coating, and heating to at least 621° F. to dry and fuse the polytetrafluoroethylene coating. The coated fabric has an overall thickness of 10 mils and is substantially impermeable to air.

Figure 1:
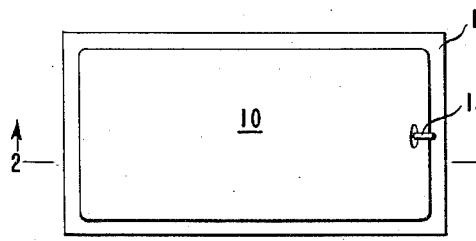
FIGURE 1 is a top view of an assembly of plies ready for laminating, with the edges of the outer plies bonded together to form an air impermeable seal.
Figure 2:
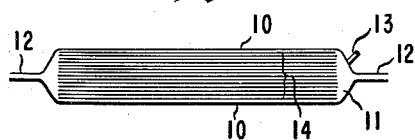
FIGURE 2 is a transverse cross-sectional view taken on line 2—2 of FIGURE 1.

Referring now to FIGURES 1 and 2 of the drawing, two sheets of the flexible polytetrafluoroethylene coated glass fabric 10, measuring 20 x 30 inches are brush coated on the marginal edges of one surface with a one inch strip of an aqueous dispersion containing 60% by weight of polytetrafluoroethylene. After a brief drying period, the two sheets 10 are placed in superposed relation with the coated marginal edges of each sheet in contact with each other. An envelope-like enclosure 11 is made from the two sheets by heat sealing the marginal areas 12 on all but one edge. The heat sealing or edge bonding is accomplished by means of a hand operated gas-fired flat iron heated to about 800° F. A vent tube 13 equipped with an automatic valve (not shown) suitable for attachment to a vacuum pump or aspirator is installed in the top ply 10 near the edge of the envelope.

Twelve plies of the above described flexible polytetrafluoroethylene coated fabric 14 measuring 16 x 26 inches are inserted in the open end of the envelope, after which the open edge of the envelope is heat sealed in the same manner as the other three edges. The vent 13 projecting from the top ply 10 is connected to a vacuum pump. Air is evacuated from the envelope to a pressure of 5 mm. of mercury; atmospheric pressure is thereby exerted uniformly on the outer surfaces of the envelope. While the vacuum is held constant, the evacuated assembly is subjected to an ambient air temperature of 750° F. in an oven for 10 minutes, whereby all fourteen plies of the coated fabric are bonded together into an integral laminated structure. Cooling and trimming the sealed edges completes the method of this example. The product is a high quality semi-rigid heat resistant electrical insulation material.

Quite unexpectedly, the laminate produced by the method of this example under a pressure no greater than atmospheric pressure has substantially the same properties as a laminate made from a like number of plies of the same material in a hydraulic press under 1500 p.s.i. of pressure and the same temperature and duration of dwell. The properties of the product of this example are as follows:

| | ASTM Test Method |
|---|---|
| Thickness, 143 mils | |
| Tensile strength, 15,380 p.s.i. | D229–49 |
| Flexural strength, 10,318 p.s.i. | D229–49 |
| Water Absorption (24 hrs. at 75° F.), 0.05% | D570–54T |
| Dielectric Constant at 1 megacycle, 3.45 | D150–54T |
| Dissipation factor at 1 megacycle, 0.00071 | D150–54T |

*Example II*

This example illustrates the manufacture of a much larger laminate than the one produced in Example I.

Example I is repeated with the exception that the two outer plies of polytetrafluoroethylene coated glass fabric 10 forming the air tight enclosure 11 measure 64 inches square, and the twelve inner plies 14 measure 60 inches square. A further exception is that the polytetrafluoroethylene coating on the inner plies is uncalendered, unfused, slightly porous and pervious to air.

The large laminate made in this example has properties and uses similar to those of the product of Example I.

*Example III*

This example illustrates the preparation of a laminate of semi-cylindrical shape.

Figure 3:
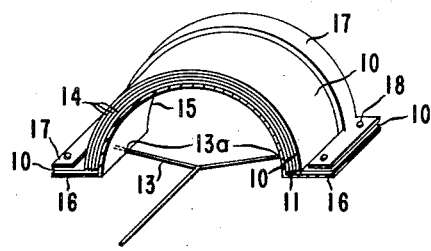
FIGURE 3 is a perspective view of an assembly of a plurality of plies ready for laminating wherein the edges of the exposed outer ply are sealed to a shaped rigid form to form an air impermeable envelope.
Figure 7:
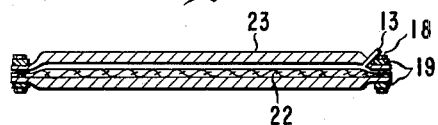
FIGURE 7 is a cross-sectional view of plies clamped together for bonding by the method of this invention.

Referring to FIGURE 3 of the drawing, thirteen plies of the flexible ten mil thick polytetrafluoroethylene coated glass fabric 14, described in Example I, measuring 16 x 26 inches, are superimposed over the curved surface of a polished rigid semi-cylindrical steel form 15. The semi-cylindrical form 15 has two laterally projecting base portions 16. Near each base portion 16 of the semi-cylindrical form 15 are openings 13a to which is attached a Y vent tube 13 having a valve (not shown) in the base portion of the Y. The width of the semi-cylindrical steel form 15 is twenty inches, the periphery of the curved surface is twenty-six inches in length and each base portion 16 of form 15 extends two inches beyond the curved surface.

A top outer ply 10 of the polytetrafluoroethylene coated fabric, described above, measuring 20 x 30 inches is superposed over the thirteen superposed inner plies 14 on the form 15 so that its edges extend two inches beyond the edges of the thirteen plies 14. The top outer ply 10 is coextensive with the width, curved surface and base portions of the form 15.

An air impermeable seal is provided at all 4 edges of the top ply and the edges of form 15 by means of a rigid steel clamp 17 shaped to fit the edge configuration of the form. After tightly securing the clamp 17 to the base portions 16 and to the sides of the curved portions of the form 15 by means of bolts 18, the thirteen inner plies 14 are enclosed within an air impermeable envelope 11 formed by the flexible top ply 10 and the rigid form 15 shown in FIGURE 3.

The fourteen plies of polytetrafluoroethylene coated glass fabric 14 are then bonded into an integral laminated structure in accordance with the evacuation and heating cycle of Example I. On removal of the clamp 17 and form 15, the semi-cylindrical semi-rigid laminated product is found to have essentially the same properties as the product of Example I.

In order to make such a product by conventional press methods, an extremely heavy and expensive mold would be needed.

Equally good results are obtained when an unsupported film of polytetrafluoroethylene is used in place of one or both polytetrafluoroethylene coated glass fabric outer plies.

*Example IV*

This example illustrates the making of a laminate having metallic surface layers.

Two clean sheets of 1½ mil aluminum foil measuring 20 x 30 inches are coated on one side with an aqueous suspensoid of polytetrafluoroethylene containing chromic acid. This is a primer composition known to improve the adhesion of polytetrafluoroethylene materials to metal. A full description of the primer composition and its method of application are given in Example I of U.S. Patent 2,562,117 issued July 24, 1951 to L. K. Osdal.

Figure 4:
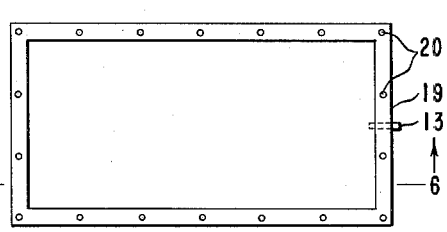
FIGURE 4 is a top view of a vented clamp for sealing the edges of the outer plies of the superposed plies.
Figure 5:
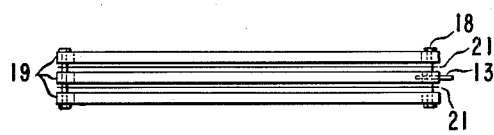
FIGURE 5 is a front view of a clamped assembly of plies.
Figure 6:
FIGURE 6 is a cross-sectional edge view of FIGURE 5 showing an arrangement of sheets and clamps near the vent.

With reference to FIGURES 4, 5 and 6 of the drawing, three identical flat rectangular clamps 19 are made from steel bars 2 inches wide and ¼ inch thick, enclosing a space measuring 18 x 28 inches. Aligned bolt holes 20 are drilled in the clamps in sufficient number to permit forming an air impermeable seal. A vent 13 is provided in one of the clamps, which is fitted with a tube leading to a vacuum pump. One of the primed sheets of aluminum foil 21, coating side up, is superposed over one of the unvented clamps with the edges coextensive with the outer edges of the clamp 19.

The vented clamp is superimposed over the border area of the coated aluminum foil so that the bolt holes 20 of clamp 19 are in line with those of the bottom clamp 19. Twelve plies of the ten mil thick polytetrafluoroethylene coated glass fabric 14 of Example I, measuring 16 x 26 inches, are then superimposed over the coated area of the foil 21 within the open area of the vented clamp 19. The other primed sheet of coated foil 21, coating side down, is superimposed over the top ply of coated fabric 14, with the border areas of the coated foil 21 co-extensive with the top side of the vented clamp 19. The third clamp 19 (unvented) is superimposed over the border area of the top sheet of coated foil 21 with bolt holes 20 aligned with those in the other two clamps 19. The clamps 19 are fastened together with bolts 18 to form an air impermeable seal between the edges of the aluminum foil sheets 21 and the vented clamp 19, thereby enclosing the coated glass fabric plies 14 within an airtight envelope 11. Repeating the evacuating and heating operations of Example I, the coated aluminum foil 21 and coated glass fabric plies 14 are bonded together securely, resulting in an integral laminated structure. The metallic-surfaced product is particularly useful in forming a heat resistant printed electrical circuit material by printing the electrical circuit with an acid resistant material on one or both sides of the laminate, etching the unprinted area away from the polytetrafluoroethylene coated glass fabric then removing the acid resistant material from the underlying aluminum foil.

*Example V*

This example illustrates how to make a polytetrafluoroethylene coated glass fabric laminate surfaced on one side with an adherent oxide-free layer of copper foil.

A woven glass fabric weighing 1.43 oz./sq. yd. is impregnated and coated on each side with a copolymer of 85 parts of tetrafluoroethylene and 15 parts of hexafluoropropene to a final thickness of three mils. The coating composition and its method of application are in accordance with the teaching set forth in E. L. Yuan's copending U.S. application Serial Number 666,481, filed June 18, 1957.

Using the clamps shown in FIGURE 4, a 20 x 30 inch sheet of 2 oz./sq. ft. electrolytic copper foil, substantially free of oxides, is placed over the bottom clamp 19 with coated side up, the edges of the foil being coextensive with the edges of the clamp.

The vented clamp 19 is placed over the copper foil, then a 20 x 30 inch ply of the above described copolymer coated glass fabric is superposed over the foil within the inner boundaries of the clamps 19. Over the copolymer coated glass fabric ply and also within the clamps are positioned eight plies of the ten mil thick polytetrafluoroethylene coated glass fabric of Example I, all measuring 16 x 26 inches. A top ply of aluminum foil is used as described in Example 4, except that the bottom side of the foil which contacts the polytetrafluoroethylene coated glass fabric is coated with a thin film of silicone fluid in place of the primer coat. The third clamp is positioned over the aluminum foil and the clamps are bolted together and the air is evacuated from the envelope formed by the foil plies to an absolute pressure of 5 mm. of mercury. Hydrogen gas is then introduced into the envelope through the vent to a pressure of one atmosphere, followed by re-evacuation to a pressure of 5 mm. of mercury. The assembly is heated for 10 minutes in an oven having an atmosphere of hydrogen and an ambient temperature of 750° F., meanwhile maintaining the vacuum. All the plies are tenaciously bonded together except for the silicone coated aluminum foil, which is stripped from the laminate after the clamps are removed. Free of interfering copper oxides, the copper-surfaced product is an excellent heat resistant laminate from which printed electrical circuits can be formed.

*Example VI*

This example illustrates the production of a twelve ply laminate of polytetrafluoroethylene coated glass fabric. Example IV is repeated except the surface of the aluminum foil contacting the polytetrafluoroethylene coated glass fabric is treated with silicone fluid instead of the aqueous suspensoid of polytetrafluoroethylene containing chromic acid. After the lay-up enclosed in the aluminum foil envelope is evacuated and heated, as described in Example IV, the aluminum envelope is removed therefrom. The product of this example has properties substantially the same as those of the product described in Example I.

It will be understood that the above examples are merely illustrative and that the present invention resides primarily in the discovery that surprisingly high quality dense laminates can be made by employing heat and relatively low pressure to bond together two or more superposed polytetrafluoroethylene plies, all of the plies becoming a part of the laminate, except in those cases where the exterior plies are strippable from the laminate. It was particularly surprising to discover that dense thick laminates of polytetrafluoroethylene coated glass fabric plies could be formed with pressure no greater than atmospheric pressure.

When it is desired to bond polytetrafluoroethylene plies to a rigid sheet or shaped object, the latter becomes a part of the air impermeable envelope. Suitable polymeric interlayers or special coatings can be used to accomplish a bond to the surface of the rigid object if suitable adhesion is not otherwise obtainable. On the other hand, when one or both of the exterior plies is to be removed after laminating, a release agent can be applied to the side of the ply or plies in contact with the laminate, when necessary to prevent adhesion. A separate non-bondable ply, either rigid or flexible, can also be used as an inner ply during lamination which is removed after edge-trimming, dividing the structure into two separate laminates.

The exterior plies should preferably be larger than the inner plies to facilitate edge-sealing of the envelope. It is within the scope of this invention to employ polytetrafluoroethylene plies which are the same size and to seal the edges of all the plies to form the air impermeable envelope. Any convenient sealing method capable of providing an air impermeable seal can be used, such as, e.g., clamping, cementing, folding, soldering and taping. All of the plies forming the laminate can be coextensive and the edges of all plies sealed to form an air impermeable envelope, in those cases where the inner plies are air permeable and only the outer plies are air impermeable.

The size, number and location of the vents through which the air is evacuated from the assembly are not critical. However, for obvious reasons, such as product appearance, it is usually preferable to locate the vent or vents near the edge of the assembly.

The pressure within the envelope should be substantially less than atmospheric pressure, e.g., less than about one-half of an atmosphere (380 mm. of mercury) and preferably less than about 30 mm. of mercury. When it is difficult to evacuate the envelope without entrapping air pockets, e.g., in very large or oddly shaped laminates a rigid-faced outer envelope can be provided outside the flexible exterior plies, and evacuated first to hold the plies apart. For example, the outer envelope can be the outer clamps shown in FIGURE 5, modified to contain rigid surface plates and vents. After evacuating the outer envelope, whereby the sides of the inner envelope are held apart against the plates, the inner envelope is evacuated. Atmospheric pressure is then restored to the outer envelope. The outer envelope can also serve as a heat zone and/or pressure chamber into which additional pressure and heating media may be introduced for the bonding operation. For instance, hot air, gas, steam, liquid, or fluidized solid can be introduced at or above atmospheric pressure to cause the plies to bond together. In the absence of an outer envelope, the plies can be subjected to such media and pressures in an oven or other enclosure, for whatever time and at whatever temperature is found convenient to accomplish the lamination.

The method of this invention has numerous important advantages which will be readily apparent to persons familiar with the art of making polytetrafluoroethylene laminates. One advantage is that there is practically no limit to the size of laminates obtainable by this method. Another advantage is the simplicity and low cost of the equipment used, regardless of the size or shape of laminate concerned. A further advantage is the adaptability of the method to the use of special laminating atmospheres, either between the plies or at the outer surface. Other advantages include the low laminating pressures required; the ease of completely releasing entrapped air; and the feasibility of employing extra high temperatures or exacting temperature controls during lamination.

The novel method of this invention is useful for laminating or bonding plies of flexible polytetrafluoroethylene sheet materials to themselves or to rigid plies. It is particularly useful for making laminates, especially for the electrical industry. The method has unique utility for making unusually large and irregularly shaped laminates.

This application is a continuation-in-part of my co-pending application S.N. 686,187, filed September 25, 1957, now abandoned.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. The method of preparing dense laminates which comprises:
   (a) arranging a plurality of superposed plies of reinforced polytetrafluoroethylene sheet material in direct contact with each other,
   (b) placing said superposed plies in an air impermeable envelope at least one side of which is collapsible,
   (c) evacuating a substantial portion of the air from within said envelope to a pressure of less than about 380 mm. of mercury within said envelope, (d) heating said plies while under said sub-atmospheric pressure to at least 621° F. to bond said plies into an integral laminate, (e) cooling said laminate, and (f) removing said laminate from said envelope.

2. The method of preparing dense laminates which comprises:

(a) arranging a plurality of superposed plies consisting essentially of polytetrafluoroethylene sheet material in direct contact with each other.

(b) placing said superposed plies in an air impermeable envelope at least one side of which is collapsible, (c) evacuating a substantial portion of the air from within said envelope to a pressure of less than about 380 mm. of mercury within said envelope, (d) heating said plies while under said sub-atmospheric pressure to at least 621° F. to bond said plies into an integral laminate, and (e) cooling said laminate.

3. The method of preparing dense laminates which comprises:

(a) arranging a plurality of superposed plies of reinforced polytetrafluoroethylene sheet material, the two outer plies of which are air impermeable and extend beyond the edges of the intermediate plies, (b) sealing the edges of the two outer plies of said polytetrafluoroethylene sheet material to form an air impermeable envelope for the intermediate plies, (c) evacuating a substantial portion of the air from within said envelope to a pressure of less than about 380 mm. of mercury within said envelope, (d) heating said plies while under said sub-atmospheric pressure to at least 621° F. to bond said plies into an integral laminate, and (e) cooling said laminate.

4. The method of preparing dense laminates which comprises:

(a) arranging a plurality of superposed plies of reinforced polytetrafluoroethylene sheet material in direct contact with each other, (b) placing said superposed plies of polytetrafluoroethylene sheet material between two outer plies of metal foil which extend beyond said superposed plies, the surface of at least one ply of said metal foil which contacts said polytetrafluoroethylene sheet material being treated to render it bondable thereto, (c) sealing the edges of said metal foils to form an air impermeable envelope, (d) evacuating a substantial portion of the air from within said envelope to a pressure of less than about 380 mm. of mercury within said envelope, (e) heating said plies while under said sub-atmospheric pressure to at least 621° F. to bond said plies into an integral laminate, and (f) cooling said laminate.

References Cited in the file of this patent

UNITED STATES PATENTS

| | | |
|---|---|---|
| 1,274,206 | Shuman et al. | July 30, 1918 |
| 2,088,352 | Vierkötter | July 27, 1937 |
| 2,427,183 | Berry | Sept. 9, 1947 |
| 2,484,484 | Berry | Oct. 11, 1949 |
| 2,531,007 | Strom et al. | Nov. 21, 1950 |
| 2,731,068 | Richards | Jan. 17, 1956 |
| 2,747,180 | Brucker | May 22, 1956 |
| 2,783,176 | Boicey | Feb. 26, 1957 |
| 2,786,792 | Mikiska | Mar. 26, 1957 |